No. 699,044. Patented Apr. 29, 1902.
E. J. VRAALSTAD.
THRESHING MACHINE.
(Application filed Jan. 25, 1901.)
(No Model.)
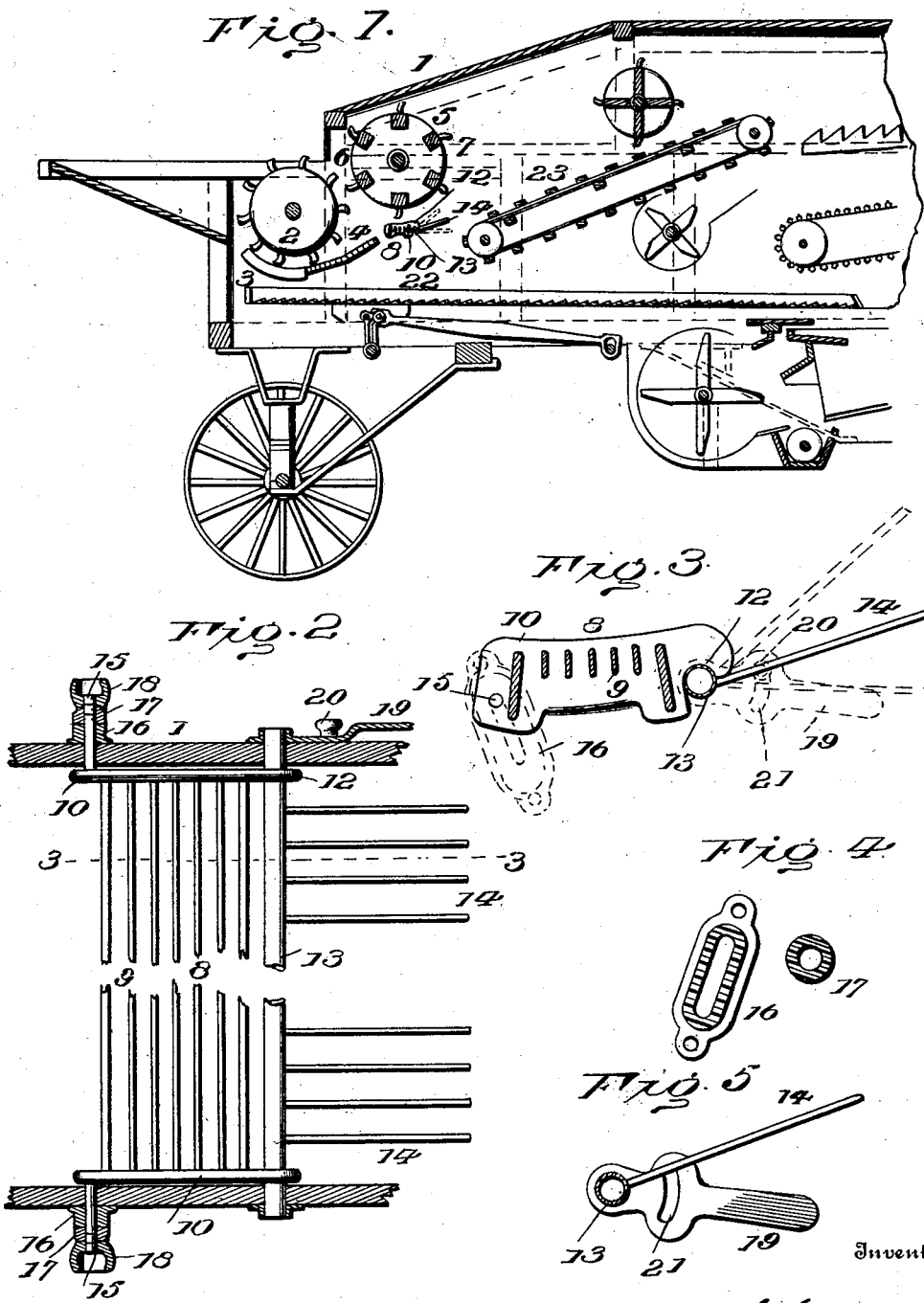

UNITED STATES PATENT OFFICE.

EDWARD J. VRAALSTAD, OF BUFFALO, NEW YORK, ASSIGNOR TO BUFFALO PITTS COMPANY, OF BUFFALO, NEW YORK, A CORPORATION OF NEW YORK.

THRESHING-MACHINE.

SPECIFICATION forming part of Letters Patent No. 699,044, dated April 29, 1902.

Application filed January 25, 1901. Serial No. 44,729. (No model.)

*To all whom it may concern:*

Be it known that I, EDWARD J. VRAALSTAD, of Buffalo, in the county of Erie and State of New York, have invented certain new and useful Improvements in Threshing-Machines; and I do hereby declare the following to be a full, clear, and exact description of the invention, such as will enable others skilled in the art to which it appertains to make and use the same.

This invention contemplates certain new and useful improvements in threshing-machines.

The object of the invention is to provide improved means for effectively separating grain from its straw and delivering the two elements separately without allowing them to again mix together.

A further object is to provide simple mechanism for adjusting the parts to suit varying volumes of straws.

The invention comprehends the employment of a beating-drum positioned in such relation to the threshing-cylinder that, together with suitable grating, the straw after leaving the cylinder will be acted upon by the drum without undue crowding thereof, and grain thrown against the drum by the cylinder will be deflected downward onto a conveyer-pan, while the straw will by means of adjustable separating-forks be directed onto a rake or conveyer-belt.

The invention will be hereinafter fully set forth, and particularly pointed out in the claims.

In the accompanying drawings, Figure 1 is a vertical longitudinal sectional view of a portion of a threshing-machine equipped with my present improvements. Fig. 2 is an enlarged plan view with parts broken away. Fig. 3 is a cross-sectional view on line 3 3, Fig. 2. Figs. 4 and 5 show details.

Referring to the drawings, 1 designates the frame of a threshing-machine, a portion only of which is shown; 2, the threshing-cylinder, equipped with the ordinary threshing-teeth; 3, a concave, and 4 a grate beneath the threshing-cylinder. This grate is elongated in the direction of the passage of straw and is carried upwardly and rearwardly.

5 designates a beating-drum located in rear of and raised above the threshing-cylinder. This drum has a continuous inclosing casing 6 and is equipped with peripheral beaters 7, which in the rotation of the drum just clear the teeth of the cylinder. By journaling the beating-drum on a plane considerably above the journal-bearings of the threshing-cylinder the bearings of the drum and cylinder may be placed nearer together vertically than if the bearings were on substantially the same horizontal plane. The tendency of the straw to follow the rotation of and wind around the threshing-cylinder is offset by the action of the beating-drum, which being journaled on a higher plane than the cylinder and nearer to the latter than otherwise permissible draws the straw forward away from the cylinder without allowing it to compact and interfere with the free passage of the grain downward. In this way the speed of the straw is accelerated instead of retarded, as occurs where the cylinders are on practically the same level. Beneath the drum is a grate 8, which is composed of iron slats 9, spaced apart and running crosswise of the machine and secured at their ends in end plates 10, which are held together by suitable means. Each end plate is formed with a hook 12, engaging a cross rod or tube 13, supported by the sides of the thresher, and from which rod project forwardly-extended spaced-apart separating-forks 14. The end plates 10 are capable of being adjusted so as to increase or diminish the straw-space between the cylinder and the drum and to set the slats at different angles to permit of the proper passage of the grain. For this purpose a threaded-bolt 15 projects laterally from each plate through a slot in the side of the thresher and a coincident slot in a serrated plate 16, against which a correspondingly-serrated washer 17 may be held by a nut 18 on the end of bolt 15. The separating-forks are likewise capable of being adjusted and held in different positions, as indicated in Fig. 3. For this purpose a handle-plate 19 is secured on one end of the cross-rod 13, and a thumb-screw 20, passed through a slot 21 in such plate, will hold the latter at the desired point. It will be observed that the forward end of grate 4 is in close juxtaposition to the receiving end of grate 8, and by adjusting the latter at its receiving end a greater or lesser space may be provided for the straw between the cylinder and drum, and the slats 9 may thereby be positioned at different angles to insure the proper discharge of the grain.

By the described relative arrangement of the cylinder, the drum, and the grates I utilize the centrifugal action of the cylinder in separating the grain from the straw and delivering the two separately without being again mixed together. After the grain and straw pass over concave 3 they are carried over grate 4, which occupies such relation to the cylinder that the grain will be forced therethrough and be received onto a conveyer-pan 22, while the long straw, being lighter and of greater volume, is carried by the cylinder and then caught by the beating-drum, which in turn carries it over grate 8 and forks 14, from which it will fall onto any suitable device, such as a front straw-rake or endless belt 23, by which it is conveyed to the ordinary agitating-bolter and rattle-rake to the rear of the machine. The drum is placed higher than and is as close to the threshing-cylinder as possible, so that flying grain will strike the inclosing casing of such drum at its lower part and be free to fly downward and backward through the straw, which not being crowded by the drum allows the grain to pass through it and the grate and fork onto the conveyer-pan. It is not necessary to make reference to the distributing grain-board and other necessary adjuncts of a threshing-machine, since they form no part of my present invention.

From what has been said the advantages of my present invention are apparent to those skilled in the art. Practice has demonstrated that by the described construction and arrangement the results obtained are practically perfect, that the separation of the grain from the straw is quickly and most thoroughly accomplished, and that there is practically no waste of grain. I have also found it exceedingly advantageous to be able to adjust the grate and fork beneath the separating-cylinder according to the volume of straw being acted upon and the discharge it is desired to maintain.

I claim as my invention—

1. The combination with the threshing-cylinder, the concave thereunder and the rearwardly-extended grate leading from the concave, of the beating-drum mounted on a plane considerably above and in rear of the cylinder in such relation thereto that grain discharged by the latter will strike the lower portion of the drum and be freely deflected downward through the straw, a grate beneath said drum pivoted at one end, means for adjusting the position of said grate, forks extending forwardly of said grate in the line of the discharge of the straw carried by the beaters of the drum, and mounted on the pivot-bearings of the grate, and means for adjusting said bearings and regulating the position of the fork, substantially as set forth.

2. The combination with the threshing-cylinder, the concave, the grate extending therefrom, of the beating-drum mounted on a plane considerably above and in rear of the cylinder in such relation thereto that grain discharged by the latter will strike the lower portion of the drum and be deflected downward, a grate located beneath the drum composed of spaced-apart cross-bars and end plates, pivot-bearings for the outer ends of said plates, screw-rods carried by said end plates, and means engaging said rods for locking said end plates in position, substantially as set forth.

3. The combination with the threshing-cylinder, the concave, and the grate leading therefrom, of the beating-drum mounted on a plane considerably above and in rear of the cylinder in such relation thereto that grain discharged by the latter will strike the lower portion of the drum and be deflected downward, a grate beneath the drum having end plates, a cross-rod upon which said end plates are pivoted, means for adjusting the positions of said end plates, forks extending from said cross-rod, and means engaging one end of the latter for adjusting the positions of the forks, substantially as set forth.

In testimony whereof I have signed this specification in the presence of two subscribing witnesses.

EDWARD J. VRAALSTAD.

Witnesses:
H. P. SEIPP,
W. W. TENNANT.